United States Patent [19]

Hase et al.

[11] Patent Number: 4,731,460

[45] Date of Patent: Mar. 15, 1988

[54] ACYLCYANAMIDE COMPOUNDS AND THEIR PRODUCTION

[75] Inventors: Christian Hase, Erkrath; Bernd Wegemund, Haan; Werner Erwied, Langenfeld; Dieter Krampitz, Moenchengladbach, all of Fed. Rep. of Germany

[73] Assignee: Henkel Kommanditgesellschaft auf Aktien, Duesseldorf, Fed. Rep. of Germany

[21] Appl. No.: 878,085

[22] Filed: Jun. 24, 1986

[30] Foreign Application Priority Data

Jun. 24, 1985 [DE] Fed. Rep. of Germany ....... 3522532

[51] Int. Cl.$^4$ .................. C07F 11/00; C07F 3/06; C07F 7/24; C07F 15/06
[52] U.S. Cl. ............................. 556/45; 556/81; 556/110; 556/118; 556/138; 260/404.5
[58] Field of Search ........... 260/404.5 CN; 556/45, 556/118, 110, 81, 138

[56] References Cited

U.S. PATENT DOCUMENTS

| | | | |
|---|---|---|---|
| 2,418,476 | 4/1947 | Nagy et al. | 556/118 |
| 3,297,743 | 1/1967 | Blanchard | 556/138 X |
| 3,309,333 | 3/1967 | Mod et al. | 260/404.5 CN X |
| 3,519,661 | 7/1970 | Mod et al. | 260/404.5 CN X |
| 3,564,607 | 2/1971 | Breuer | 556/118 |
| 3,644,455 | 2/1972 | Onsager | 556/138 |
| 3,799,960 | 3/1974 | Marks | 556/45 X |
| 4,550,203 | 10/1985 | Stockinger et al. | 564/105 |

FOREIGN PATENT DOCUMENTS 0087394 6/1984 European Pat. Off. .

OTHER PUBLICATIONS

Chemical Abstracts 62 13146f (1965).
Chemical Abstracts 78 84537b (1973).
Chemical Abstracts 86 106735j (1977).
Encyclopedia of Polymer Science and Technology, vol. 12, Wiley–Interscience Publications, New York, 1970, pp. 737–768.
J. prakt, Chemie, N.F. vol. 11 (1875), pp. 343–347; vol. 17 (1875), pp. 9–13.

*Primary Examiner*—Helen M. S. Sneed
*Attorney, Agent, or Firm*—Ernest G. Szoke; Henry W. Millson, Jr.; Mark A. Greenfield

[57] ABSTRACT

Acylcyanamides are disclosed having the formula

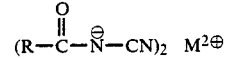

in which the symbol R represents a straight-chain or branched chain alkyl or alkenyl group having from about 5 to about 21 carbon atoms, which group may be substituted by OH—, O—CH$_2$—CH$_2$—OH— and/or O—R'— groups, where the symbol R' represents an alkyl group having from 1 to about 4 carbon atoms and wherein M is a manganese, iron, cobalt, nickel, zinc, cadmium, copper and/or lead.

The compounds of the invention are useful as heat stabilizers for chlorine-containing polymers.

26 Claims, No Drawings

ACYLCYANAMIDE COMPOUNDS AND THEIR PRODUCTION

BACKGROUND OF THE INVENTION

1. Field of the Invention

This invention relates to new acylcyanamides of divalent metals and to their use as heat stabilizers for chlorine-containing polymers, particularly polyvinylchloride or polymers containing vinylchloride. It relates also to a process for producing the novel acylcyanamides.

2. Description of Related Art

In the molding of thermoplastic polymers to tubes, bottles, profiles, films, etc. by processes including extrusion, injection molding, blow-molding, deep-drawing and calendering, degradation of the plastic material involved can take place due to the high temperatures encountered. Degradation is manifested by undesirable discoloration of the plastic and in a deterioration in its mechanical properties.

To prevent, or at least minimize this, stabilizers are added to the polymers before molding to counteract degradation. The heat stabilizers which are used for polyvinylchloride, and for copolymers essentially containing vinylchloride, are generally inorganic and organic lead salts, organic antimony compounds, organotin compounds as well as cadmium/barium carboxylates and phenolates. The foregoing metal compounds are normally designated as primary stabilizers, with secondary stabilizers or co-stabilizers often being added to the primary stabilizers to enhance their effectiveness. Additional information relating to the heat stabilizers normally used for vinylchloride polymers can be found in the technical literature, as, for example, Encyclopedia of Polymer Science and Technology, Vol. 12 Wiley-Interscience pub., New York, 1970, pages 737 to 768.

The stabilizers mentioned heretofore have, in general, been acceptable in actual use. However, certain polyvinylchloride mixtures yield products having undesirable properties, such as, unsatisfactory initial and/or long-term stability values. These values cannot be corrected or improved by modifying the presently known stabilizers or stabilizer mixtures or by increasing the quantities of stabilizers used. In addition, certain objections of a toxicological nature have been raised regarding the use of lead, antimony and cadmium compounds in certain fields. On the other hand, although many organotin compounds are toxicologically safe, their high price is an obstacle to their widespread use. For this reason, attempts have long been made to replace these compounds by safer, inexpensive compounds.

For example, certain fatty acid salts, aromatic carboxylates and phenolates of the metals calcium, barium, zinc and aluminium have been advocated as primary stabilizers, optionally supported by co-stabilizers such as, for example, organic phosphites, imino compounds, epoxy compounds, polyhydric alcohols or 1,3-diketones. Unfortunately, however, these stabilizer systems do not impart adequate initial stability and/or adequate long-term stability to the molding compositions sought to be stabilized. In particular, undesirable premature termination of long-term stability, reflected by the sudden blackening of the polyvinylchloride molding compositions, is observed when stabilizer combinations which contain unduly large quantities of zinc soaps, are used to improve initial stability. This sudden blackening is known as zinc burning. Accordingly, there is a need for compounds which will provide an initial and/or long term effect to stabilizer systems for molding compositions based on polyvinylchloride.

DESCRIPTION OF THE INVENTION

Other than in the operating examples, or where otherwise indicated, all numbers expressing quantities of ingredients or reaction conditions used herein are to be understood as modified in all instances by the term "about."

It has been found that new acylcyanamides, derived from $C_6$ to $C_{22}$ fatty acids, of the metals manganese, iron, cobalt, nickel, zinc, cadmium, copper and lead are quite effective when used to stabilize polyvinylchloride molding compositions. These acylcyanamides may also be used for modifying stabilizer systems which are based on lead, antimony, cadmium/barium and organotin compounds, as well as stabilizer systems based on calcium, barium, zinc and aluminium compounds. In particular, it has been found that the acylcyanamides of toxicologically acceptable divalent metal cations are particularly suitable for the production of recently developed stabilizer systems insofar as they provide a means of avoiding the undesirable phenomenon of zinc burning and improving initial stability by replacing the zinc soaps which are normally used with corresponding acylcyanamides.

Accordingly, the present invention relates to acylcyanamides having the formula

in which the symbol R represents a straight-chain or branched chain alkyl or alkenyl group having from about 5 to about 21 carbon atoms which may optionally be substituted by OH—, O—$CH_2$—$CH_2$—OH— and/or O—R'— groups; where the symbol R' represents an alkyl group having from 1 to about 4 carbon atoms; and wherein $M^{2\oplus}$ is at least one manganese, iron, cobalt, nickel, iron, cadmium, copper or lead cation.

The present invention also provides a process for producing the acylcyanamides corresponding to Formula I which process is characterized in that a acylcyanamide alkali metal salt corresponding to the following formula

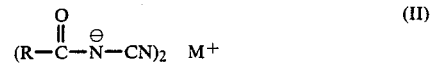

in which the symbol R is as defined in Formula I; and $M^+$ is an alkali metal cation, preferably a lithium, sodium or potassium cation, is reacted in aqueous or aqueous/methanolic solution with stoichiometric quantities of water-soluble manganese, iron, cobalt, nickel, zinc, cadmium, copper and/or lead salt. The acylcyanamide which is formed, corresponding to Formula I, is subsequently isolated from the reaction mixture.

Sodium acylcyanamides corresponding to Formula II are preferably used as starting material for the preparation of the acylcyanamides of Formula I.

The alkali metal cyanamides corresponding to Formula (II) can be obtained, for example, by reaction of cyanamide with carboxylic acid chlorides and subsequent neutralization with alkali metal hydroxides, carbonates and bicarbonates (cf. J. prakt. Chemie, N. F.

Vol. 11 (1875), pp. 343–347; Vol. 17 (1878), pp. 9–13). On an industrial scale, the alkali metal acylcyanamides can be produced by reaction of cyanamide with alkali metal methylate and fatty acid methylester in stoichiometric quantities in methanol as solvent. A reaction time of from 1 to 5 hours at reflux temperature is generally sufficient to obtain a complete reaction. Since the reaction is quantitative, the product is worked up simply by the removal of the methanol by any appropriate method.

The acylcyanamides corresponding to Formula I are prepared by double decomposition of alkali metal acylcyanamides with water-soluble salts of appropriate metals in aqueous or aqueous/alcoholic solutions. The chlorides, sulfates and acetates of the previously mentioned metals, providing they are readily soluble in water, are suitable for this reaction. The acylcyanamides of the divalent metals are poorly soluble in water. Accordingly, they accumulate during production as deposits which have to be filtered off and dried.

The acyl groups R—CO— of the compounds corresponding to Formula (I) are derived from straight-chain or branched, saturated or unsaturated $C_6$ to $C_{22}$ fatty acids. Thus, for example, they are derived from fatty acids emanating from fats and oils of vegetable or animal orgin, such as caproic acid, caprylic acid, capric acid, lauric acid, myristic acid, palmitic acid, stearic acid, arachidic acid, behenic acid, palmitoleic acid, oleic acid, erucic acid, linoleic acid and linolenic acid. Such acyl groups may be derived from individual fatty acids or from fatty acid mixtures. In the latter case they are derived from fatty acid mixtures of the type accumulating in the lipolysis of natural fats and oils. In addition, the acyl groups of the acylcyanamides can also be derived from synthetic branched chain fatty acids containing from about 6 to 27 carbon atoms. The acyl groups can also be derived from fatty acids substituted by OH-groups, for example, from ricinoleic acid and hydrogenated ricinoleic acid. The acyl groups can also emanate from fatty acids substituted by O—$CH_2$—$CH_2$—OH— groups and R'—O— groups, wherein the symbol R' is a $C_1$ to $C_4$ alkyl group. Fatty acids such as these may be obtained from epoxy fatty acids, for example, epoxy stearic acid, by opening the oxirane ring with ethylene glycol, or from $C_1$ to $C_4$ alcohols. In a preferred embodiment of the invention, the acyl groups of the acylcyanamides corresponding to Formula (I) are derived from straight-chain, preferably unsubstituted fatty acids containing from about 12 to about 18 carbon atoms, i.e. R in formula I represents a $C_{11}$ to $C_{17}$ alkyl group.

In polyvinylchloride melting compositions, the acylcyanamides corresponding to Formula I manifest an above-average heat-stabilizing effect which, by suitable choice of the metal cations, may be directed both toward enhancing initial stability and also toward improving long-term stability. Use of the zinc acylcyanamides of this invention has a positive effect on the initial stability of PVC-molding compositions, without the undesirable zinc burning, even in relative high concentrations. In addition, PVC-molding compositions containing acylcyanamides instead of the usual stabilizers, such as metal soaps, are characterized by their improved transparency.

The acylcyanamides corresponding to Formula (I) can be used as the sole primary stabilizers in the polyvinylchloride molding compositions. However, they can also be used in admixture with other known primary stabilizers, such as, inorganic and organic lead salts, organic antimony compounds, organotin compounds, cadmium/barium carboxylates and phenolates of calcium, barium, zinc and aluminium.

In addition to the primary stabilizers mentioned, the stabilized polyvinylchloride molding compositions may contain known co-stabilizers, lubricants, plasticizers, antioxidants, additives for improving impact strength, fillers and other auxiliaries.

The stabilized thermoplastic molding compositions are based on homopolymers or copolymers of vinylchloride. The copolymers contain at least 50 mole percent, and preferably at least 80 mole percent, of vinylchloride. The polymers may have been produced by any conventional method, for example, by suspension, emulsion or block polymerization. Their K-value may be in the range of from about 35 to 80. Molding compositions based on after-chlorinated polyvinylchloride and on resin mixtures predominantly containing homopolymers or copolymers of vinylchloride may also be stabilized with the acylcyanamide compounds of this invention.

The use of the acylcyanamides of Formula I as heat stabilizers for chlorine-containing polymers is not being claimed in this application but instead is the subject of a separate patent application filed by Applicants on the same date.

For a fuller understanding of the nature of objects of this invention, reference may be had to the following Examples which are given merely as further illustrations of the invention and are not to be construed in a limiting sense. In the Examples, the percentages set forth are percentages by weight, unless otherwise indicated.

EXAMPLES

1.

Production of acylcyanamides of Formula I

Example 1

In a reaction vessel equipped with a stirrer, dropping funnel, theremometer, gas inlet pipe and reflux condenser, 42 grams (1.0 mole) of cyanamide were added with stirring under nitrogen at room temperature to 184.3 grams of a 29.3% solution of sodium methylate (54 grams=1.0 mole) in methanol. 214.3 grams (1.0 mole) of methyllaurate were then added, after which the mixture was boiled for about 3 hours under reflux and, finally, was cooled to room temperature. The lauroyl cyanamide sodium salt was dissolved in the freshly prepared suspension at a temperature of about 75° C. after addition of 2.2 liter water. A solution of 110.3 grams (0.5 mole) zinc diacetate dihydrate in 600 ml water was then added dropwise with stirring over a period of 1 hour at the same temperature, with a white deposit rapidly forming. The mixture was then stirred for another hour at a temperature of 75° C. The solid product was separated off from the cooled mixture by filtration, washed with water until it was free from acetate and dried in vacuo at a temperature of about 60° C. to constant weight. The yield was 254 grams (99.3% of the theoretical).

Analysis: $C_{26}H_{50}N_4O_2Zn$ (MW 516.38): Calculated (%): 60.5 C; 9.8 H; 10.9 N; 6.2 O; 12.7 Zn. Found (%): 60.4 C; 9.2 H; 10.4 N; 5.9 O; 13.6 Zn.

IR-spectrum (KBr; $cm^{-1}$) 1695; 2220.

EXAMPLE 2

A solution of 110.3 grams (0.5 mole) of zinc acetate dihydrate in 600 ml water was added dropwise with stirring at a temperature of 75° C. to a solution of 246.3 grams (1.0 mole) lauroyl cyanamide sodium salt in 2.4 liter of water, resulting in the formation of a white deposit. After the addition, the mixture was stirred for 1 hour at a temperature of 75° C. The solid product was separated off by filtration, washed with water until it was free from acetate and then dried in vacuo to constant weight. The yield was 254 grams (99.3% of the theoretical).

Analysis: $C_{26}H_{50}N_4O_2Zn$ (MW 516.38): Calculated (%): 60.5 C; 9.8 H; 10.9 N; 6.2 O; 12.7 Zn. Found (%): 60.4 C; 9.2 H; 10.4 N; 5.9 O; 13.6 Zn.

IR-Spectrum (KBr; $cm^{-1}$) 1693; 2225.

Examples 3 to 12

Acylcyanamide salts derived from fatty acids with the following divalent cations: magnesium, barium, lead, cobalt, copper and manganese, were prepared as described in Example 1 by double decomposition of acylcyanamide sodium salts with corresponding metal salts. According to analysis, all the salts prepared had the composition $(acyl-CN_2)_2M$ and were virtually insoluble in water. In their dry state, the cobalt, copper and manganese salts were respectively blue, pale green and light brown in color. Particulars of a few mixtures for preparing the above-mentioned salts are shown in Table I below.

TABLE I

Preparation of acylcyanamide salts of divalent cations

| | Starting materials | | | | End products | |
|---|---|---|---|---|---|---|
| | Na—acylcyanamide | | Metal salt | | Solvent | Yield | |
| Example No. | Acyl | Quantity (moles) | Type | Quantity (moles) | $H_2O$ (l) | % of Theory | IR Bands $(cm^{-1})$ |
| 3 | $C_{12}$ | 1.0 | $Pb(OAc)_2.3H_2O$ | 0.5 | 2.0 | 95 | 1690; 2150 |
| 4 | $C_{18}$ | 0.8 | $Pb(OAc)_2.3H_2O$ | 0.4 | 4.0 | 94 | 1635; 2180 |
| 5 | $C_{12}$ | 1.0 | $Co(OAc)_2.4H_2O$ | 0.5 | 2.4 | 95 | 1685; 2205 |
| 6 | $C_{18}$ | 0.8 | $Co(OAc)_2.4H_2O$ | 0.4 | 5.5 | 97 | 1610; 2205 |
| 7 | $C_{12}$ | 1.0 | $Co(OAc)_2.H_2O$ | 0.5 | 2.6 | 95 | 1690; 2190 |
| 8 | $C_{18}$ | 0.8 | $Cu(OAc)_2.H_2O$ | 0.4 | 6.7 | 99 | 1690; 2190 |
| 9 | $C_{12}$ | 1.0 | $MnSO_4.H_2O$ | 0.5 | 2.0 | 95 | 1570; 2210 |
| 10 | $C_{18}$ | 0.8 | $MnSO_4.H_2O$ | 0.4 | 3.5 | 98 | 1580; 2180 |
| 11 | $C_{18}(R)$* | 0.57 | $Zn(OAc)_2.2H_2O$ | 0.285 | 1.25 | 95 | 1695; 2220 |

*Acyl group derived from hydrogenated ricinoleic acid

Use of the acylcyanamides corresponding to Formula I for stabilizing polyvinylchloride molding compositions

Production and testing of the rough sheets

In Examples 13 to 20, the effect of the stabilizer combinations was tested with reference to the "static thermal stability" of rough sheets. To this end, polyvinylchloride molding compositions containing stabilizer mixtures were processed for 5 minutes to test sheets on Berstorf laboratory mixing rolls measuring 450×220 mm rotating in the same direction (roll temperature 170° C., roll speed 300 r.p.m.). The sheets, about 0.5 mm thick, were cut into square test specimens having edge lengths of 10 mm which were then exposed to a temperature of 180° C. in a Heraeus FT 420 R drying cabinet comprising 6 rotating shelves. Samples were removed at 10 minute intervals and examined for changes in color.

Example 12

A processing aid combination having the following composition (pbw=parts by weight)
100 pbw calcium stearate
20 pbw stearic acid
20 pbw paraffin, Mp. 71° C.
50 pbw pentaerythritol ester of stearic acid (molar ratio 1:1.5; OH number 212)
was prepared by mechanically mixing the components. Stabilizer compositions A, B, C and D were obtained by adding 5, 10 and 20 pbw zinc lauroyl cyanamide or 20 pbw zinc stearoyl cyanamide, respectively, to, and mixing with, 190 pbw of the processing aid composition specified above.

For comparison tests, stabilizer combinations E, F and G were obtained by adding 5, 10 and 20 pbw zinc stearate to, and mixing with, 190 pbw of the basic formulation indicated above.

The polyvinylchloride molding compounds A' to G' of which the compositions are shown in Table II were obtained by the mechanical mixing of 100 pbw suspension PVC (K-value 70; "Vestolit" S 7054, a product of Chemische Werke Huls, Marl, F.R. Germany) with 2.4 to 3.9 pbw of the stabilizer combinations A to G.

The stabilized polyvinylchloride molding compositions were tested by the method described above. Table II below shows the time after which the first discoloration was observed and then the time after which the test was terminated because of excessive discoloration (stability failure).

TABLE II

| | Polyvinylchloride molding compositions | | | | | | |
|---|---|---|---|---|---|---|---|
| Constituent (pbw) | A' | B' | C' | D' | E' | F' | G' |
| Suspension PVC | 100 | 100 | 100 | 100 | 100 | 100 | 100 |
| Calcium stearate | 1.0 | 1.0 | 1.0 | 1.0 | 1.0 | 1.0 | 1.0 |
| Stearic acid | 0.2 | 0.2 | 0.2 | 0.2 | 0.2 | 0.2 | 0.2 |
| Paraffin | 0.2 | 0.2 | 0.2 | 0.2 | 0.2 | 0.2 | 0.2 |
| Pentaerythritol stearic acid acid ester | 0.5 | 0.5 | 0.5 | 0.5 | 0.5 | 0.5 | 0.5 |
| Zinc lauroyl cyanamide | 0.5 | 1.0 | 2.0 | — | — | — | — |
| Zinc stearoyl cyanamide | — | — | — | 2.0 | — | — | — |
| Zinc stearate | — | — | — | — | 0.5 | 1.0 | 2.0 |
| First discoloration (minutes) | 0 | 30 | 30 | 30 | 0 | 20 | 10 |
| Stability failure (minutes) | 30 | 40 | 50 | 50 | 40 | 40 | 30 |

Example 13

A polyvinylchloride molding composition consisting of:
100 pbw suspension PVC (K-value 70; see Example 12)
0.2 pbw stearic acid
0.2 pbw paraffin, Mp. 71° C.
0.5 pbw pentaerythritol ester of stearic acid (molar ratio 1:1.5; OH number 212)
was mixed with stabilizer combinations of this invention comprising:
(a) sodium alumosilicate, calcium stearate and zinc lauroyl cyanamide,
(b) sodium alumosilicate, calcium stearoyl cyanamide and zinc stearate or zinc lauroyl cyanamide.
and, for comparison purposes, with stabilizer mixtures of
(c) sodium alumosilicate, calcium stearate and zinc stearate.

The sodium alumosilicate used was a finely divided synthetic zeolite NaA ($Na_2O:Al_2O_3:SiO_2 = 0.9:1:2.4$; water content 19% by weight). The compositions of the stabilized polyvinylchloride molding compounds H' to Q' thus obtained are shown in Table III.

The thermoplastic molding compositions H' to Q' were tested for their static thermal stability by the method described above. The results obtained are set out in Table III.

Example 14

The thermoplastic molding composition R' was obtained by mixing 100 pbw suspension PVC (K-value 68; "Vestolit" S 6858, a product of Chemische Werke Huls, Marl, F.R. Germany)
0.2 pbw stearic acid
0.2 pbw paraffin, Mp. 71° C.
0.5 pbw (pentaerythritol ester of stearic acid (molar ratio 1:1.5, OH number 212)
with the stabilizer combination R' of
0.5 pbw calcium stearoyl cyanamide
1.0 pbw zinc lauroyl cyanamide For the preparation of molding compositions S' to AA', the stabilizer combination specified above was modified by the following additions:
(S') 0.5 pbw sodium salt of malic acid
(T') 0.5 pbw sodium salt of tartaric acid
(U') 0.5 pbw tetrol of limonene diepoxide
(V') 0.5 pbw adduct of $C_{12}$–$C_{14}$ alkylamine with 4 moles glycidol
(W') 0.5 pbw rongalite C
(X') 0.5 pbw 3-heptyl-4-hexyl-2-pyrazolin-5-one
(Y') 1.0 pbw sodium alumosilicate (see Example 2)
(Z') 0.2 pbw sodium salt of malic acid 1.0 pbw sodium alumosilicate (see Example 2)
(AA') 0.2 pbw sodium salt of malic acid 0.5 pbw adduct of $C_{12}$–$C_{14}$ alkylamine and 4 moles glycidol The compositions of the stabilized polyvinylchloride molding compounds R' to AA' obtained in this way are shown in Table IV.

The molding compositions R' to AA' were tested by the method described heretofore. The results obtained are set out in Table IV.

TABLE III

| Constituent (pbw) | Polyvinylchloride molding compositions | | | | | | | | | |
|---|---|---|---|---|---|---|---|---|---|---|
| | H' | I' | J' | K' | L' | M' | N' | O' | P' | Q' |
| Suspension PVC | 100 | 100 | 100 | 100 | 100 | 100 | 100 | 100 | 100 | 100 |
| Stearic acid | 0.2 | 0.2 | 0.2 | 0.2 | 0.2 | 0.2 | 0.2 | 0.2 | 0.2 | 0.2 |
| Paraffin | 0.2 | 0.2 | 0.2 | 0.2 | 0.2 | 0.2 | 0.2 | 0.2 | 0.2 | 0.2 |
| Pentaerythritol stearic acid ester | 0.5 | 0.5 | 0.5 | 0.5 | 0.5 | 0.5 | 0.5 | 0.5 | 0.5 | 0.5 |
| Na—alumosilicate | 1.0 | 1.0 | 1.0 | 1.0 | 1.0 | 1.0 | 1.0 | 1.0 | 1.0 | 1.0 |
| Calcium stearate | 1.0 | 1.0 | 1.0 | — | — | — | 1.0 | 0.5 | 1.0 | 1.0 |
| Zinc stearate | — | — | — | 1.0 | — | — | 0.5 | 1.0 | 1.0 | 2.0 |
| Calcium stearoyl cyanamide | — | — | — | 0.5 | 0.5 | 1.0 | 0 | 0 | 0 | 0 |
| Zinc lauroyl cyanamide | 0.5 | 1.0 | 2.0 | — | 1.0 | 2.0 | — | — | — | — |
| First discoloration (minutes) | 0 | 20 | 30 | 20 | 20 | 40 | 0 | 0 | 0 | 0 |
| Stability failure (minutes) | 50 | 60 | 60 | 50 | 60 | 70 | 70 | 40 | 50 | 40 |

TABLE IV

| Constituent (pbw) | Polyvinylchloride molding compositions | | | | | | | | | |
|---|---|---|---|---|---|---|---|---|---|---|
| | R' | S' | T' | U' | V' | W' | X' | Y' | Z' | AA' |
| Suspension PVC | 100 | 100 | 100 | 100 | 100 | 100 | 100 | 100 | 100 | 100 |
| Stearic acid | 0.2 | 0.2 | 0.2 | 0.2 | 0.2 | 0.2 | 0.2 | 0.2 | 0.2 | 0.2 |
| Paraffin | 0.2 | 0.2 | 0.2 | 0.2 | 0.2 | 0.2 | 0.2 | 0.2 | 0.2 | 0.2 |
| Pentaerythritol stearic acid ester | 0.5 | 0.5 | 0.5 | 0.5 | 0.5 | 0.5 | 0.5 | 0.5 | 0.5 | 0.5 |
| Calcium stearoyl cyanamide | 0.5 | 0.5 | 0.5 | 0.5 | 0.5 | 0.5 | 0.5 | 0.5 | 0.5 | 0.5 |
| Zinc lauroyl cyanamide | 1.0 | 1.0 | 1.0 | 1.0 | 1.0 | 1.0 | 1.0 | 1.0 | 1.0 | 1.0 |
| Malic acid, Na—salt | — | 0.5 | — | — | — | — | — | — | 0.2 | 0.2 |
| Tartaric acid, Na—salt | — | — | 0.5 | — | — | — | — | — | — | — |
| Limonene-tetrol | — | — | — | 0.5 | — | — | — | — | — | — |
| Alkylamine + 4 glycidol | — | — | — | — | 0.5 | — | — | — | — | 0.5 |
| Rongalit C | — | — | — | — | — | 0.5 | — | — | — | — |
| 3-Heptyl-4-hexyl-2-pyrazolin-5-one | — | — | — | — | — | — | 0.5 | — | — | — |
| Na—alumosilicate | — | — | — | — | — | — | — | 1.0 | 1.0 | — |
| First discoloration (minutes) | 20 | 0 | 30 | 30 | 30 | 0 | 10 | 20 | 20 | 30 |
| Stability failure (minutes) | 30 | 60 | 50 | 40 | 40 | 50 | 50 | 50 | 60 | 50 |

Example 15

1.0 pbw lauroyl cyanamide cobalt salt (Example 5) was added to and mixed with a basic formulation of
100 pbw suspension PVC (K-Value 70; "Vestolit" S 7054, a product of Chemische Werke Huls, Marl, F.R. Germany)
1.0 pbw calcium stearate
0.5 pbw zinc stearate
0.2 pbw stearic acid
0.2 pbw paraffin, Mp. 71° C.
0.5 pbw pentaerythritol ester of stearic acid (molar ratio 1:15; OH number 212)
The stabilized molding composition was subjected to the static thermal stability test. The first discoloration was observed after 30 minutes and stability failure occurred after 40 minutes.

Example 16

2.0 pbw stearoyl cyanamide lead salt (Example 4) were added to and mixed with a basic formulation of
100 pbw suspension PVC (K-value 58; "Solvic" 258 RA, a product of Deutsche Solvay Werke GmbH, Solingen, F.R. Germany)
0.3 pbw calcium stearate
1.0 pbw isotridecylstearate
In the testing of the stabilized molding composition by the static thermal stability test, the first discoloration was observed after 10 minutes and stability failure after 90 minutes. The molding compounds according to the invention show considerably better transparency than molding compounds which have the same composition, but which instead of lead acylcyanamide contain the same quantity of tribasic lead sulfate.

Example 17

0.1 pbw lauroyl cyanamide manganese salt (Example 9) was added to and mixed with the basic formulation of Example 15. In the testing of the stabilized molding composition by the static thermal stability test, the first discoloration was observed after 30 minutes and stability failure occurred after 40 minutes.

Example 18

0.1 pbw stearoyl cyanamide manganese salt (Example 10) was added to and mixed with the basic formulation of Example 15. In the static thermal stability test, the stabilized molding composition showed the first discoloration after 30 minutes; stability failure was observed after 40 minutes.

Example 19

0.5 gram of an acylcyanamide zinc salt, of which the acyl group was derived from hydrogenated ricinoleic acid (Example 11) was added to and mixed with a basic formulation of
100 pbw suspension PVC (K-value 61; "Vinoflex" S 6115, a product of BASF AG, Ludwigshafen, F.R. Germany)
1.0 pbw calcium stearate
0.5 pbw zinc stearate
The stabilized molding composition was subjected to the static thermal stability test. The first discoloration was observed after 10 minutes and stability failure occurred after 40 minutes.

We claim:

1. Acylcyanamide having the formula

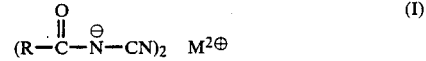

in which the symbol R represents a straight-chain or branched chain alkyl or alkenyl group having from about 5 to about 21 carbon atoms, which group may be substituted by at least one OH—, O—CH$_2$—CH$_2$—OH— or O—R'— group, in which the symbol R' represents an alkyl group having from 1 to about 4 carbon atoms; and in which the symbol M represents a manganese, iron, cobalt, nickel, zinc, cadmium, copper, or lead cation.

2. A compound of claim 1 in which R represents an alkyl group having from 11 to 17 carbon atoms.

3. A compound of claim 2 in which R represents either a C$_{11}$ or a C$_{17}$ alkyl group.

4. A compound of claim 3 in which the alkyl group represented by the symbol R is unsubstituted.

5. A compound of claim 3 in which the alkyl group represented by the symbol R is substituted by at least one —OH, O—CH$_2$—CH$_2$—OH or O—R'— group.

6. A compound of claim 5 wherein the alkyl group is ricinoleic acid, hydrogenated ricinoleic acid or epoxystearic acid.

7. A compound of claim 1 wherein R is a C$_{11}$ alkyl group and M represents a lead cation.

8. A compound of claim 1 wherein R is a C$_{11}$ alkyl group and M represents a cobalt cation.

9. A compound of claim 1 wherein R is a C$_{11}$ alkyl group and M represents a manganese cation.

10. A compound of claim 1 wherein R is a C$_{17}$ alkyl group and M represents a lead cation.

11. A compound of claim 1 wherein R is a C$_{17}$ alkyl group and M represents a cobalt cation.

12. A compound of claim 1 wherein R is a C$_{17}$ alkyl group and M represents a manganese cation.

13. A compound of claim 3 wherein R is a C$_{11}$ alkyl group and M represents a zinc cation.

14. A compound of claim 3 wherein R is a C$_{17}$ alkyl group and M represents a zinc cation.

15. A process for producing acylcyanamides having the formula

 (I)

in which the symbol R represents a straight-chain or branched chain alkyl or alkenyl, which groups may be substituted by OH—, O—CH$_2$—CH$_2$—OH— and/or O—R' in which the symbol R' represents an alkyl group having from 1 to about 4 carbon atoms and in which M$^{2+}$ represents a manganese, iron, cobalt, nickel, zinc, cadmium, copper and/or lead cation;

which comprises reacting at above room temperature an acylcyanamide alkali metal salt having the formula $$(R-\overset{O}{\underset{\|}{C}}-\overset{\oplus}{N}-CN)_2 \quad M^+ \quad \text{(II)}$$

in which R has the same meaning as in Formula I and M$^+$ is an alkali metal cation;

with about a stoichiometric quantity of a water-soluble manganese, iron, cobalt, nickel, zinc, cadmium, copper and/or lead salt, said reaction being carried out in an aqueous methanolic solution and isolating the resulting acylcyanamides of Formula I from said reaction mixture.

16. The process of claim 15 wherein $M^+$ is a lithium, sodium, or potassium cation.

17. The process of claim 15 wherein $M^+$ is a sodium cation.

18. The process of claim 15 in which R represents an alkyl group having from 11 to 17 carbon atoms.

19. The process of claim 15 in which R represents either a $C_{11}$ or a $C_{17}$ alkyl group.

20. The process of claim 19 in which the alkyl group represented by the symbol R is unsubstituted.

21. The process of claim 19 in which the alkyl group represented by the symbol R is substituted by at least one —OH, O—CH$_2$—CH$_2$—OH or O—R'— group.

22. The process of claim 21 in which the alkyl group is ricinoleic acid, hydrogenated ricinoleic acid or epoxystearic acid.

23. The process of claim 21 in which M represents at least one manganese, iron, cobalt, nickel, zinc, cadmium, copper or lead cation.

24. The reaction of claim 15, conducted at a temperature of above room temperature to reflux temperature.

25. The reaction of claim 15, conducted at a temperature of about 75° C.

26. The reaction of claim 15, conducted at a reaction-effective temperature.

* * * * *